US006626623B2

(12) United States Patent
DeLay

(10) Patent No.: US 6,626,623 B2
(45) Date of Patent: Sep. 30, 2003

(54) UNIVERSAL LOAD TIE DOWN ASSEMBLY

(76) Inventor: David A. DeLay, 1279 SW. Diamond Rd., Towanda, KS (US) 67144-9191

( * ) Notice: Subject to any disclaimer, the term of this patent is extended or adjusted under 35 U.S.C. 154(b) by 0 days.

(21) Appl. No.: 09/957,151

(22) Filed: Sep. 20, 2001

(65) Prior Publication Data

US 2003/0053879 A1 Mar. 20, 2003

(51) Int. Cl.$^7$ .................................................. B60P 7/08
(52) U.S. Cl. ...................... 410/116; 410/105; 410/106; 410/110; 410/108; 410/115
(58) Field of Search ................. 410/104, 105, 410/106, 108, 110, 115, 116; 24/265 CD, 115 K; 248/499

(56) References Cited

U.S. PATENT DOCUMENTS

| | | | | |
|---|---|---|---|---|
| 2,052,914 A | * | 9/1936 | Williams | .................... 410/9 |
| 3,353,780 A | * | 11/1967 | Young | ..................... 410/104 |
| 3,685,778 A | * | 8/1972 | Berns | ...................... 410/116 |
| 3,713,616 A | * | 1/1973 | Bowers | ..................... 410/105 |
| 3,877,671 A | | 4/1975 | Underwood et al. | |
| 4,020,769 A | | 5/1977 | Kier | |
| 4,248,558 A | | 2/1981 | Lechner | |
| 4,484,847 A | * | 11/1984 | Holmes | ..................... 410/104 |
| 4,650,382 A | | 3/1987 | Johnson | |
| 4,850,770 A | | 7/1989 | Millar, Jr. | |
| 4,954,031 A | | 9/1990 | Geeck, III | |
| 4,967,945 A | | 11/1990 | Bott | |
| 4,992,015 A | | 2/1991 | Florence | |
| 5,020,948 A | * | 6/1991 | Ihara | ........................ 410/105 |
| 5,139,375 A | | 8/1992 | Franchuk | |
| 5,259,711 A | | 11/1993 | Beck | |
| 5,273,382 A | | 12/1993 | Yearick | |
| 5,443,341 A | | 8/1995 | Hamilton | |
| 5,470,124 A | | 11/1995 | Ernst | |
| 5,533,848 A | * | 7/1996 | Davis | ......................... 410/105 |
| 5,560,576 A | | 10/1996 | Cargill | |
| 5,788,437 A | | 8/1998 | Kalis, Jr. | |
| 5,971,683 A | | 10/1999 | Hunt | |
| 6,039,520 A | * | 3/2000 | Cheng | ........................ 410/106 |
| 6,113,328 A | * | 9/2000 | Claucherty | ................ 410/106 |
| 6,168,360 B1 | * | 1/2001 | Knox | ........................... 410/96 |
| 6,256,844 B1 | | 7/2001 | Wheatley | |
| 6,350,089 B1 | * | 2/2002 | Tekavec | ..................... 410/106 |

\* cited by examiner

*Primary Examiner*—Stephen T. Gordon
(74) *Attorney, Agent, or Firm*—Kenneth H. Jack; Davis & Jack, LLC

(57) ABSTRACT

A load tying assembly consisting of first and second hook plates, each having a plurality of hook receiving apertures therethrough; and at least a first "T" hook having first and second hook ends, the "T" hook being insertable between the first and second hook plates for respective engagement of the first and second hooks ends with a pair of apertures among the first and second pluralities of hook apertures.

12 Claims, 8 Drawing Sheets

UNIVERSAL LOAD TIE DOWN ASSEMBLY

FIELD OF THE INVENTION

This invention relates to load bearing beds of trucks, trailers, railcars, and the like. More particularly, this invention relates to load tie down apparatus and assemblies adapted for securing cargo upon load bearing beds.

BACKGROUND OF THE INVENTION

A known load bed tie down assembly comprises a post mounted eye, the post and eye being fixedly attached to and rigidly extending upwardly from a load bed. Where load securing ties such as chains, ropes, or straps extend from such post mounted eyes at an angle from the axis of the post, pulling forces along the tie undesirably tend to bend or break the post. Another commonly known tie down assembly comprises an eye hook which is engageable with a hook receiving track or channel. The eye hooks of such assemblies undesirably tend to slide along the track or channel upon application of a pulling force which is not perpendicularly aligned with the track or channel.

The instant inventive tie down assembly solves or ameliorates the above undesirable traits and characteristics of known tie down assemblies by providing a T-hook having a preferred upwardly extending eye, and preferably having a lower end configured as a "J", the "T" hook being engageable in alternate orientations with a pair of parallel apertured hook plates, preferably configured as a "C" channel beam. Such assembly desirably provides for universal orientation and extension of load security ties.

BRIEF SUMMARY OF THE INVENTION

A first component of the instant inventive assembly comprises a "T" hook having upturned first and second hook ends. Tie attaching means preferably extend upwardly from an upper end of the "T" hook, said means being positioned between the first and second hook ends. A preferred tie attaching means comprises a laterally oblongated eye for receipt of load strapping. A circular eye may for receipt of a tie hook may be utilized in place of or in combination with the preferred oblongated eye. Other suitable tie attaching means comprise hooks, pin and clevice fasteners, buckles, and quick disconnect couplings. Preferably, the "T" hook is fabricated from heavy gauge stamped sheet steel. Alternately, the "T" hook may be suitably fabricated from heat fusion welded steel bar stock.

Preferably, a lower end of the "T" hook forms a "J" hook, the distal end of which supports at least a third, and preferably a fourth hook end, said ends being disposed below and forwardly or rearwardly from the first and second hook ends. Preferably, both the first and second hook ends and the third and fourth hook ends are spaced apart equidistantly. Also preferably, each such hook end has a lock pin receiving aperture extending therethrough.

The inventive assembly necessarily further comprises first and second hook plates respectively having first and second pluralities of vertically extending apertures. Preferably, the hook apertures extend completely through the hook plates. Alternately, such apertures may suitably comprise downwardly opening hook end receiving voids. Preferably, the hook plates are oblong and are held in parallel alignment forming a hook receiving slot therebetween. Also preferably, the hook apertures are laterally spaced apart from each other at even intervals. The hook apertures preferably form a square matrix pattern wherein the lateral and longitudinal spacings of the hook apertures match the lateral spacing of the first, second, third, and fourth hook ends of the "T" hook.

A preferred means for positioning the first and second hook plates in respective parallel alignment comprises a "C" channel beam spanning between and interconnecting the outer or lateral outside ends of the first and second hook plates. Alternately, the positioning means may suitably comprise a plurality of "U" braces spanning between and interconnecting said outer ends. Where the first and second hook plates comprise aligned floor surfaces of a load bearing bed, the positioning means may suitably be integral with or identical to bracing structures underlying and supporting such bed floor.

Preferably, the first and second hook plates are composed of heavy gauge plate steel.

In use of the inventive assembly, a "T" hook configured as described above, is inserted, preferably downwardly, through the slot between the first and second hook plates, allowing the preferred eye of the "T" hook to remain above the upper surfaces of the first and second hook plates. Thereafter, the "T" hook may be rotated 90° about its vertical axis, and the first and second hook ends of the "T" hook are thereby positioned so that they underlie laterally opposing hook apertures within the first and second hook plates. Thereafter, the "T" hook may be pulled upwardly, causing the first and second hook ends to extend upwardly through said apertures. Thereafter, lock pins may be inserted through the lock pin receiving apertures which preferably extend through the first and second hook ends, preventing the "T" hook from falling downwardly out of said apertures upon release. Thereafter, a load securing tie may be attached to the eye of the "T" hook in such configuration. Upon application of a pulling force to the tie, the "T" hook may rotate or pivot upon the first and second hook plates within a longitudinally extending vertical plane. Such pivoting motion facilitates adjustment of load tying angles within said plane.

Alternately, upon such insertion of the "T" hook into the slot between the first and second hook plates, the "T" hook may remain in parallel alignment with the slot. The upwardly extending third and fourth hook ends of the preferred "J" hook may then be inserted upwardly through desired longitudinally paired apertures of the first hook plate. Alternately, upon rotation of the "T" hook 180°, the third and fourth hook ends may be upwardly extended through longitudinally paired apertures within the second hook plate. Such configurations allow the "T" hook to pivot within a vertical plane which is perpendicular to the first and second hook plates, allowing angular adjustment of the tie pulling angle within such plane. Through alternate positioning of the "T" hook upon the first and second hook plates as described above, universal tie angle adjustment may be achieved.

In practice, a single pair of first and second hook plates may suitably support and secure several "T" hooks having load ties extending therefrom at varying angles.

Accordingly, it is an object of the present invention to provide a load tie down assembly which is mechanically simple, economically constructed, and which provides for secure load tie down anchorage at varying pulling angles.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
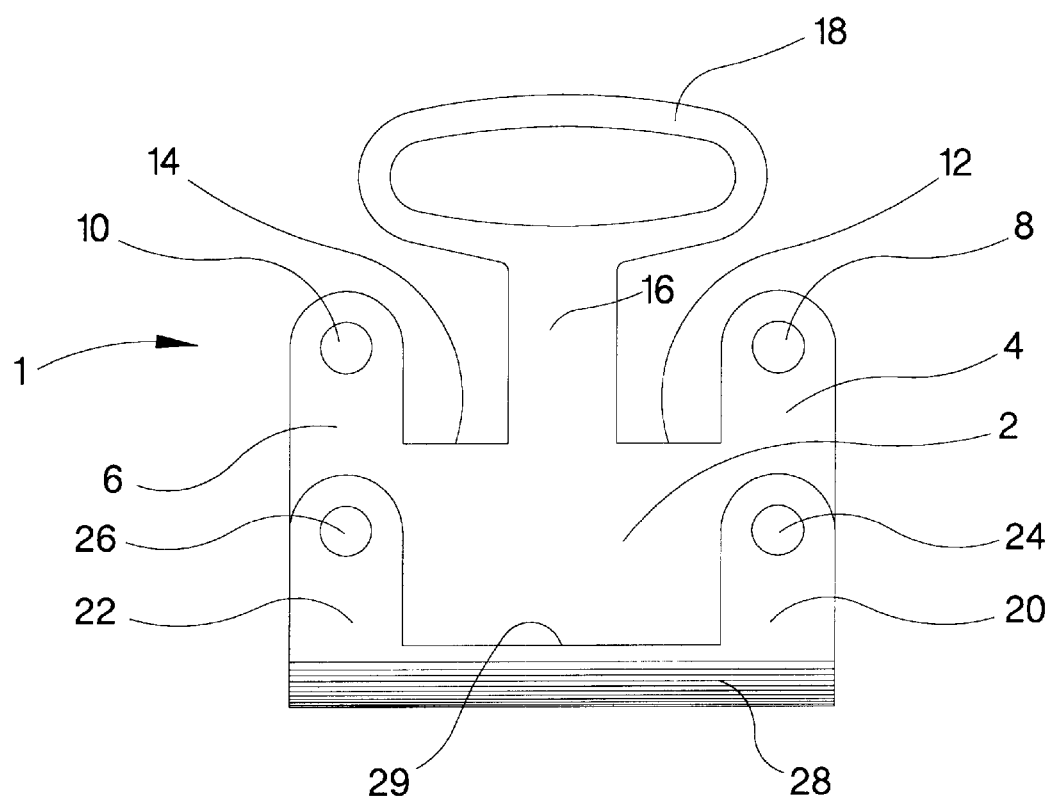
FIG. 1 is a front view of a preferred embodiment of the "T" hook utilized in the instant inventive assembly.
Figure 2:
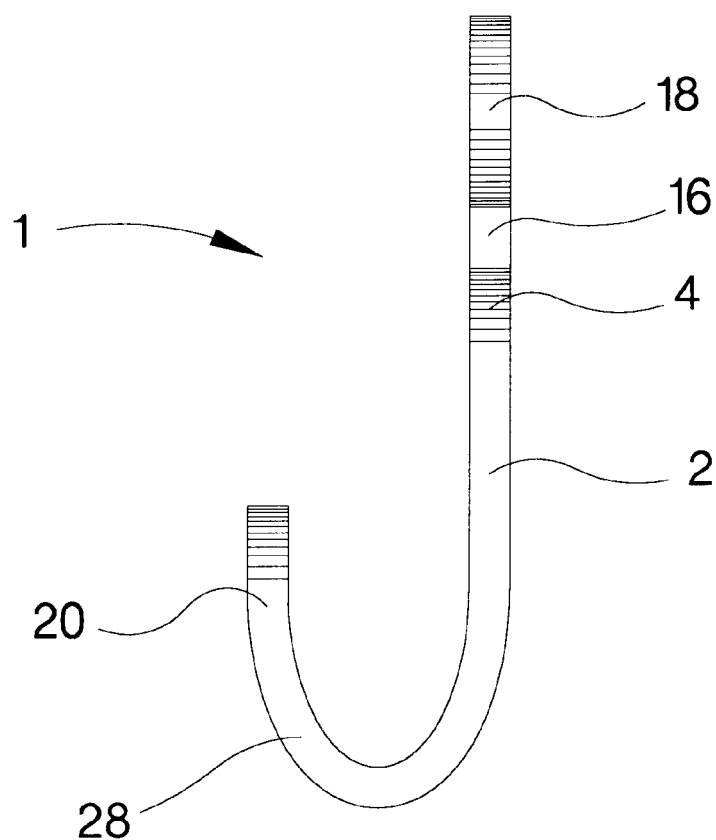
FIG. 2 is a side view of the "T" hook of FIG. 1.
Figure 5:
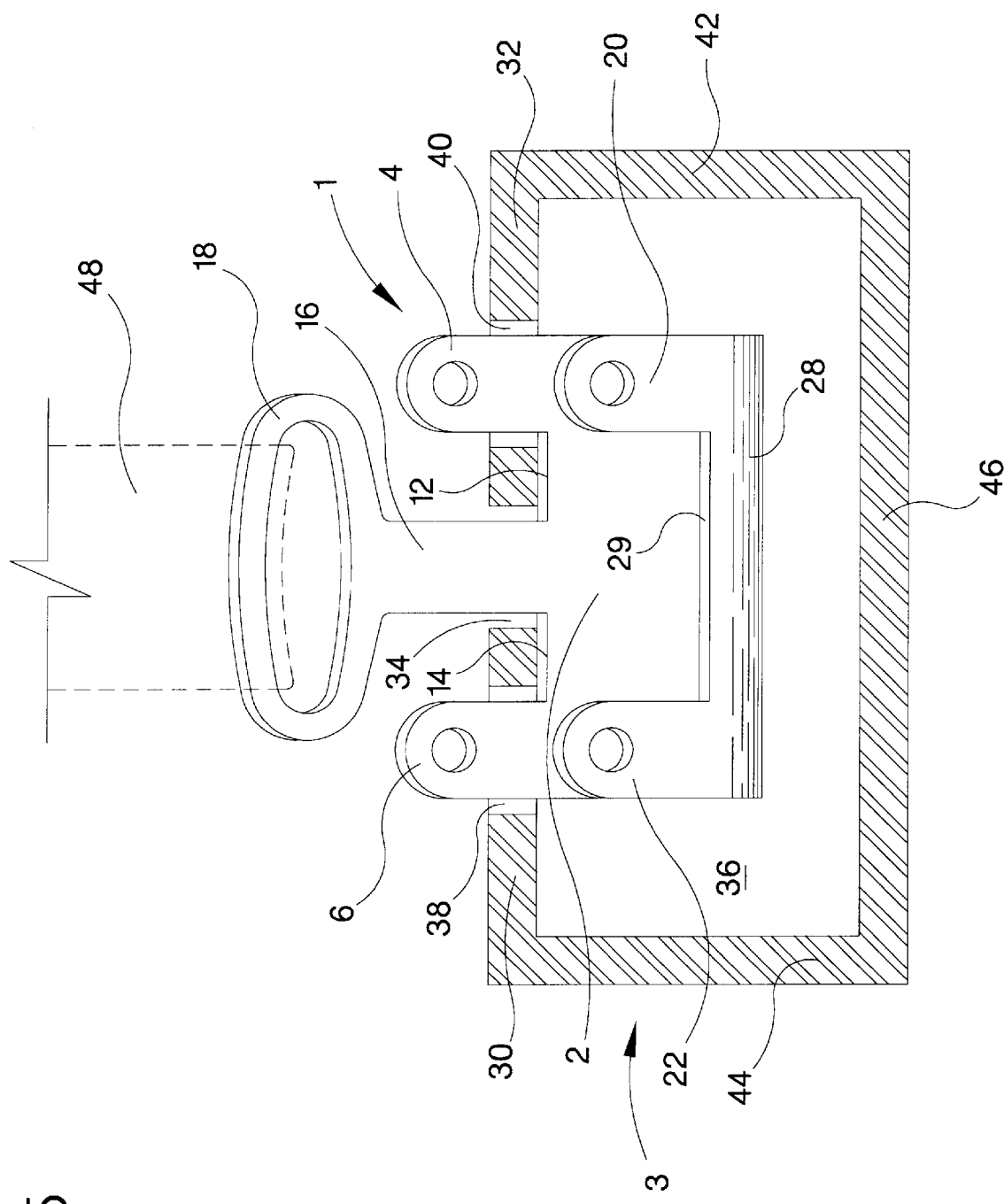
FIG. 5 is a sectional view as indicated in FIG. 4.

Referring now to the drawings, and in particular to FIG. 1, a preferred embodiment of the "T" hook utilized in the instant inventive assembly is referred to generally by Reference Arrow 1. The "T" hook 1 preferably comprises a post or neck 16, an eye 18 extending upwardly from the neck 16, a laterally extending cross member 2, and first and second hooks ends 4 and 6 extending upwardly from the outer ends of the laterally extending cross member 2. Referring simultaneously to FIGS. 1 and 2, the lower end of the laterally extending cross member 2 preferably curves forwardly or rearwardly to form a "J" hook 28, the distal end of the "J" hook 28 preferably having at least a third hook end 20, and preferably a fourth hook end 22, extending upwardly therefrom. Preferably, hook ends 4, 6, 20, and 22 have lock pin receiving apertures 8, 10, 24, and 26 respectively extending therethrough. Referring simultaneously to FIGS. 1 and 5, the upper surface of the laterally extending cross member 2 forms load bearing shoulders 12 and 14, and the distal end of "J" hook 28 provides a load bearing foot surface 29.

Figure 3:
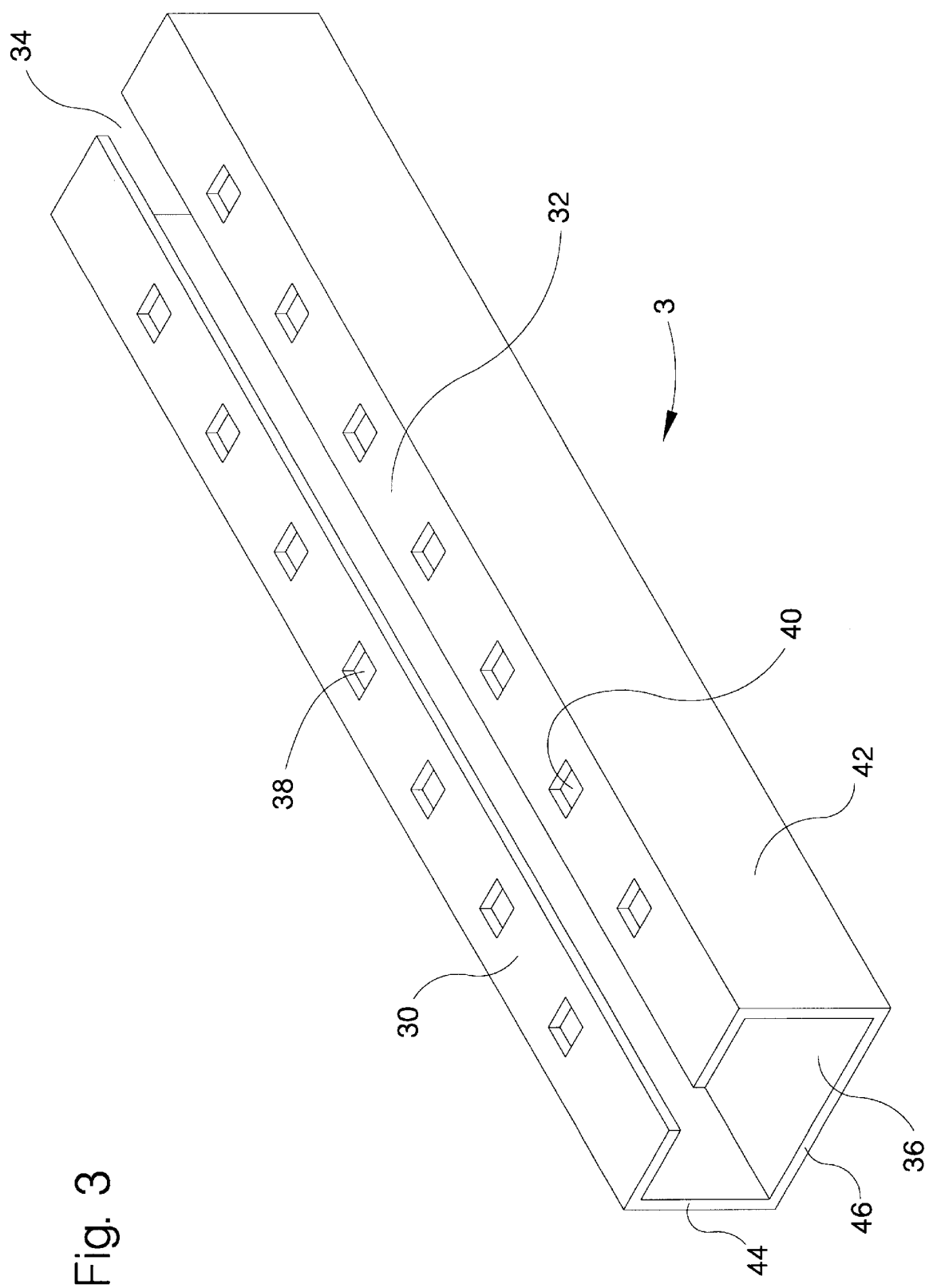
FIG. 3 is an isometric view of a preferred embodiment of the first and second hook plates and plate positioning means of the instant inventive assembly.
Figure 4:
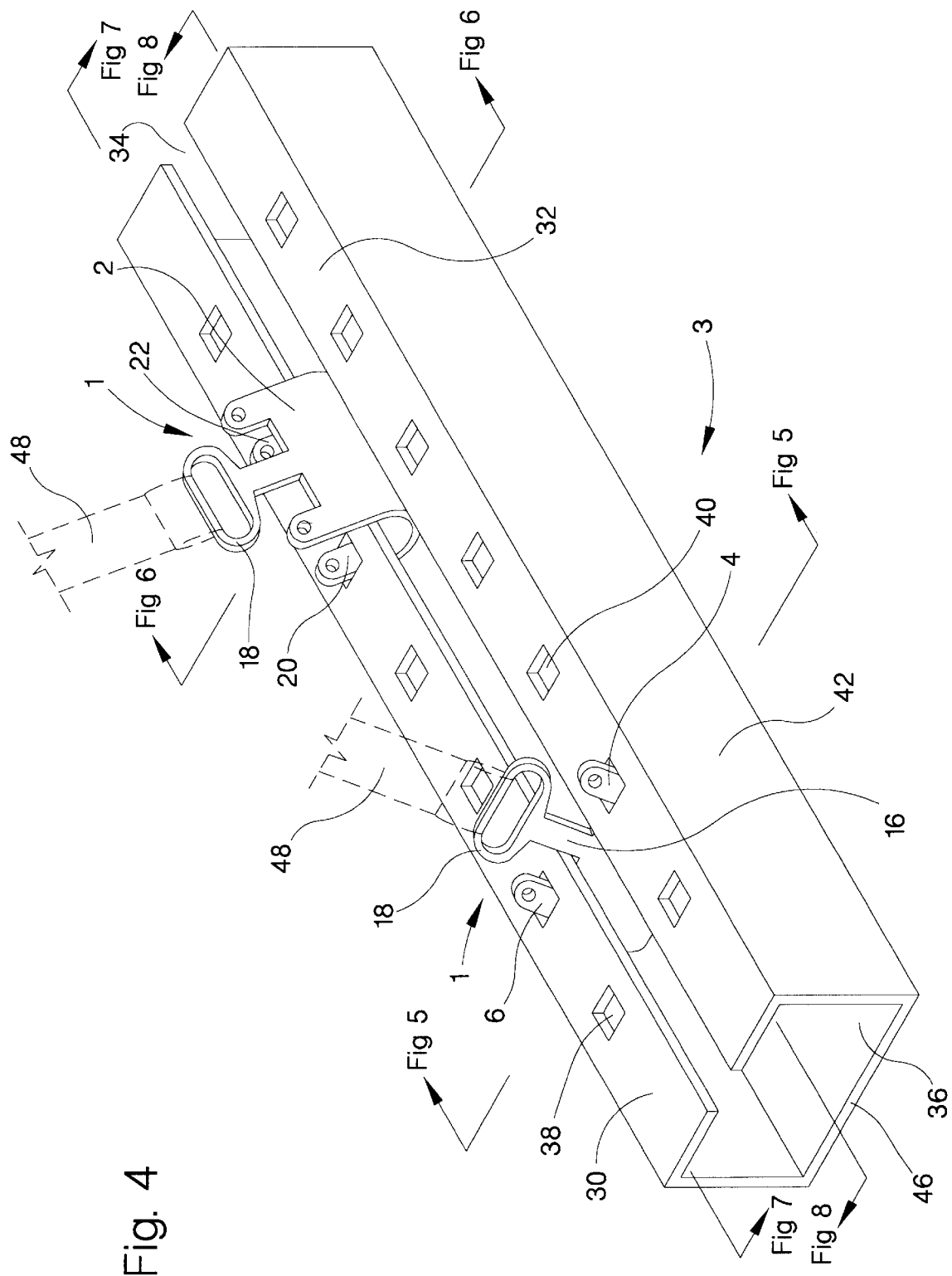
FIG. 4 redepicts FIG. 3, showing "T" hooks in use.

Referring to FIG. 3, first and second hook plates 30 and 32 are positioned in substantially parallel alignment, forming a "T" hook receiving slot 34 therebetween. First and second pluralities of hook apertures 38 and 40 preferably extend through hook plates 30 and 32, said apertures 38 and 40 preferably forming a square matrix spaced in accordance with the lateral spacings of, referring to FIG. 1, of hook ends 4 and 6, and hook ends 20 and 22. Preferably, hook plates 30 and 32 are rigidly positioned with respect to each other, as depicted, by means of a "C" channel beam referred to generally by Reference Arrow 3 comprising a web 46 having first and second upwardly extending flanges 42 and 44. Hook plates 30 and 32 in combination with flanges 42 and 44, and web 46, define an interior space 36. Preferably, the "C" channel beam is securely bolted to a load bed surface.

In use of the instant inventive assembly, referring simultaneously to FIGS. 1, 2, and 3, "T" hook 1 is initially positioned within a desired location within slot 34 so that the laterally extending cross member 2 is parallel to the slot. Such positioning may be alternately achieved through extending hook ends 20 and 22 downwardly through slot 34, or by extending "T" hook along slot 34 from one of its ends. Upon such positioning of "T" hook 1 within slot 34, the "T" hook 1 may engage hook plates 30 and 32 alternately as depicted in FIG. 5 or as depicted in FIG. 6.

Figure 8:
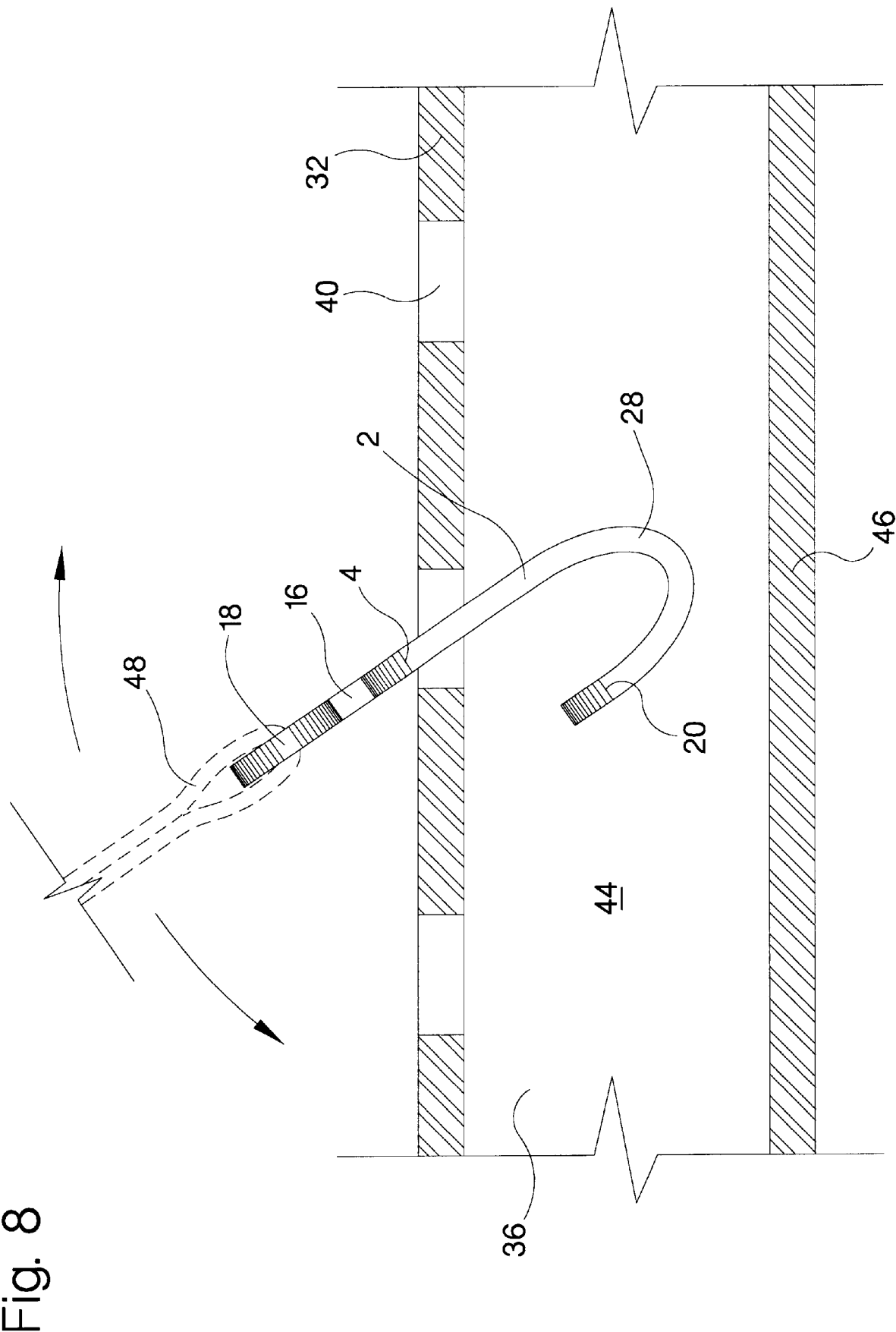
FIG. 8 is a sectional view as indicated in FIG. 4.

"In order to configure the inventive assembly as depicted in FIG. 5, the "T" hook is extended downwardly into interior space 36 through slot 34 until the upper ends of hook ends 4 and 6 underlie the lower surfaces of hook plates 30 and 32. Thereafter, the "T" hook may be rotated approximately 90° about its vertical axis until hook ends 4 and 6 underlie selected laterally opposed hook apertures 40 and 38. Thereafter, an upward pulling force may be applied to a tie strap 48 attached to eye 18, causing hook ends 4 and 6 to extend upwardly into and through hook apertures 38 and 40. Thereafter, referring simultaneously to FIGS. 5 and 6, lock pins 50 secured in place by spring rings 52 may be extended through lock pin apertures 8 and 10, securing "T" hook 1 in place. Referring simultaneously to FIGS. 5 and 8, installation of the "T" hook 5 as indicated in FIG. 5 allows a rocking motion of "T" hook 1 about bearing surfaces 12 and 14, as indicated by curved arrows."

Figure 6:
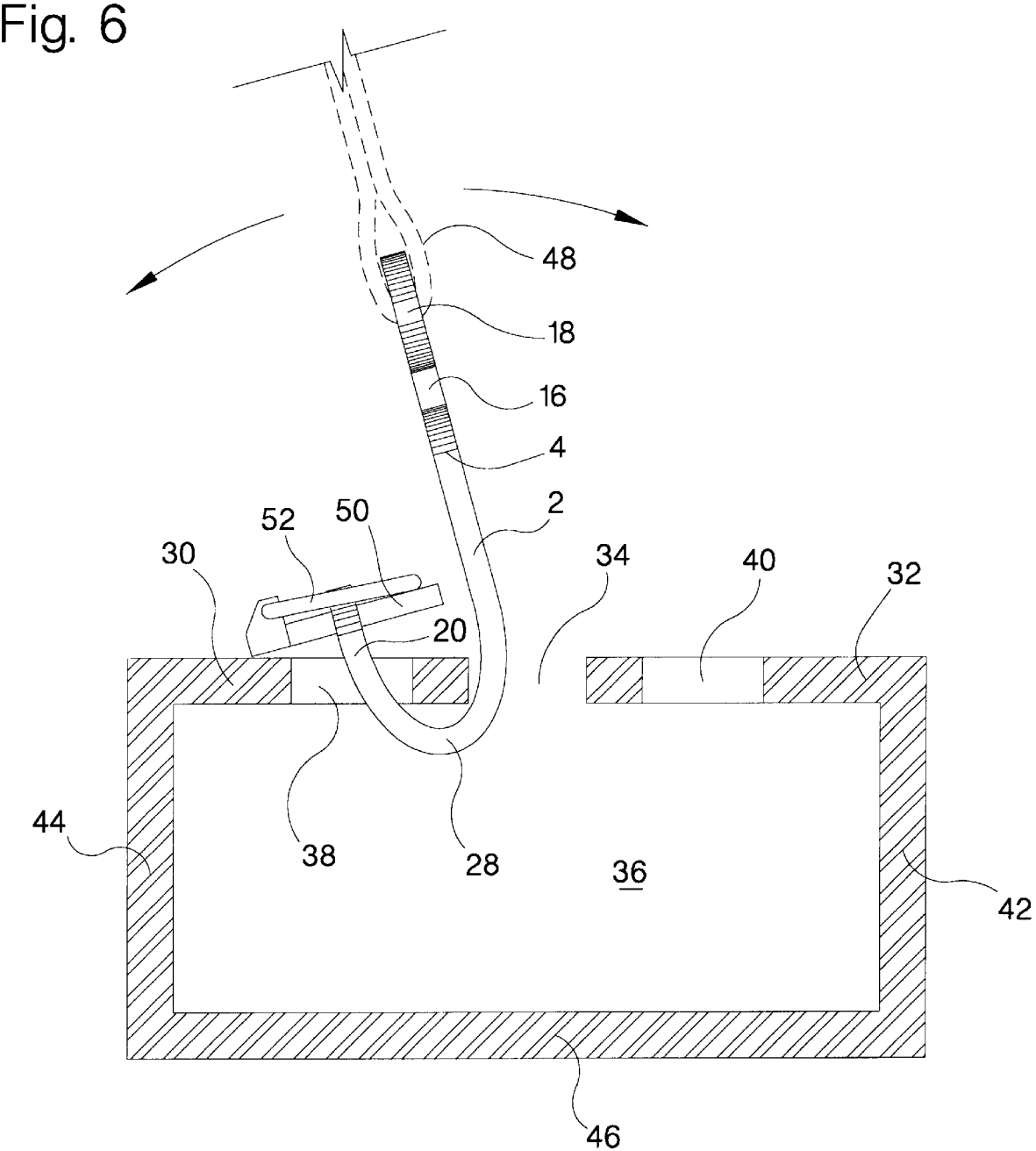
FIG. 6 is a sectional view as indicated in FIG. 4.
Figure 7:
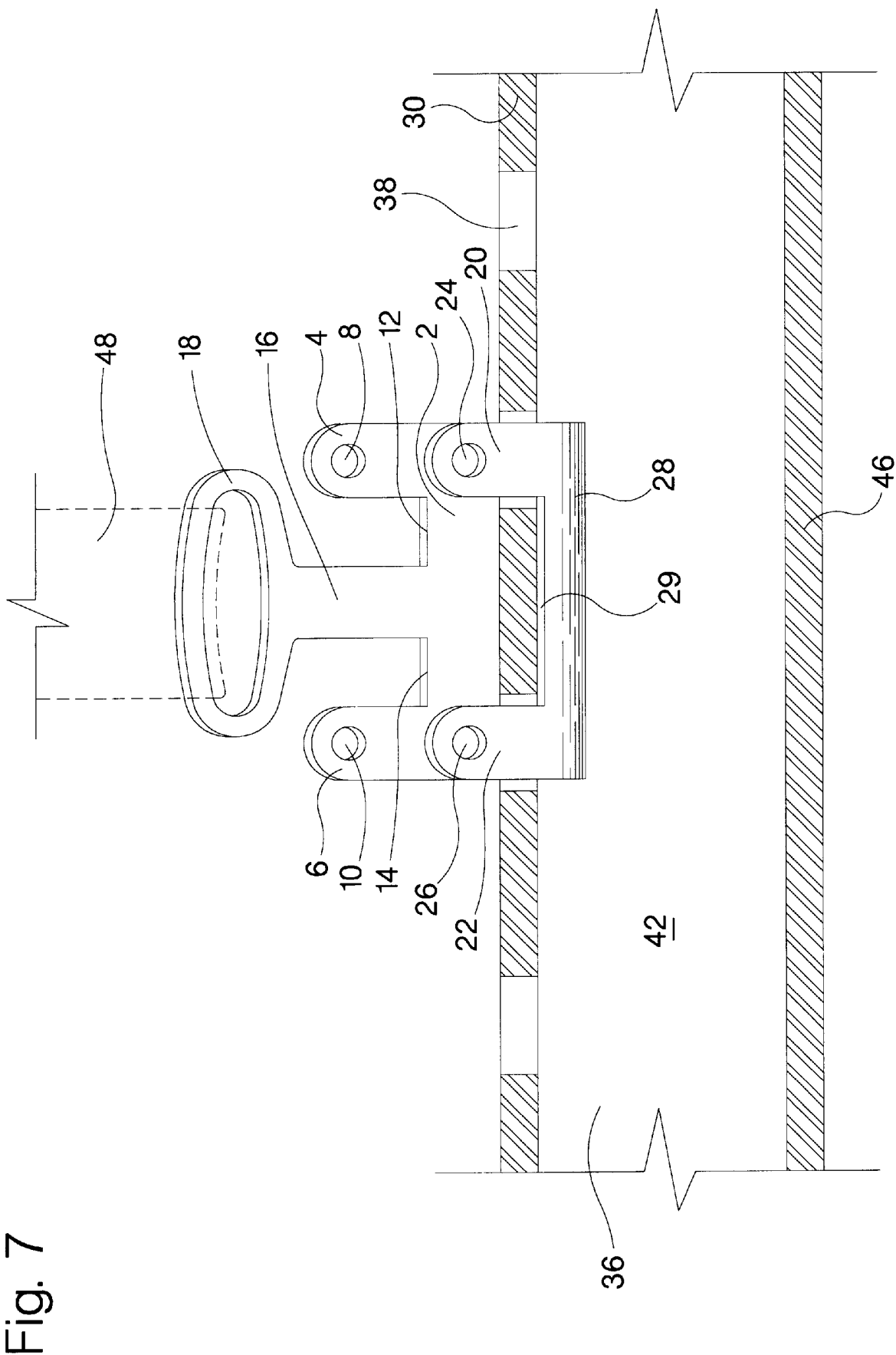
FIG. 7 is a sectional view as indicated in FIG. 4.

The orientation of the "T" hook 1 depicted in FIG. 6 is accomplished without rotation of the "T" hook 1 as discussed above in relation to the orientation of FIG. 5. Referring simultaneously to FIGS. 6 and 7, hook ends 20 and 22 extend upwardly into selected longitudinally paired hook apertures 40, facilitating rocking motion as indicated by curved arrows. To facilitate a further range of angular motion within a vertical perpendicular plane, hook ends 20 and 22 may alternately be extended upwardly through an opposing pair of hook apertures 38.

In use, the inventive assembly may be alternately applied to wall or ceiling surfaces.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A load tying assembly comprising:
   (a) first and second hook plates respectively having first and second pluralities of hook apertures, each hook plate having upwardly and downwardly facing surfaces; and,
   (b) at least a first "T" hook having first and second hook ends, said hook ends being rigidly attached to the at least first "T" hook or being wholly formed with the at least first "T" hook, the at least first "T" hook being downwardly insertable between the first and second hook plates for respective extension of the first and second hook ends into an aperture among the first plurality of hook apertures, and into an aperture among the second plurality of hook apertures.

2. The load tying assembly of claim 1 further comprising positioning means fixedly positioning the first and second hook plates in substantially parallel alignment.

3. The load tying assembly of claim 2 wherein the first and second hook plates have outer ends, and wherein the positioning means comprises a "C" channel beam spanning between said outer ends.

4. The load tying assembly of claim 3 wherein the at least first "T" hook has an upper end, and further comprising tie attaching means extending upwardly from said upper end.

5. The load tying assembly of claim 4 wherein the tie attaching means comprises an eye.

6. A load tying assembly comprising:
   (a) first and second hook plates respectively having first and second pluralities of hook apertures; and,
   (b) at least a first "T" hook having first and second hook ends, the "T" hook being insertable between the first and second hook plates for respective engagement of the first and second hook ends with an aperture among the first plurality of hook apertures, and an aperture among the second plurality of hook apertures; and positioning means fixedly positioning the first and second hook plates in substantially parallel alignment; the first and second hook plates having outer ends; the positioning means comprising a "C" channel beam spanning between said outer ends; the at least first "T" hook having an upper end, and further comprising tie attaching means extending upwardly from said upper end; the tie attaching means comprising an eye; the at least first "T" hook having a lower end forming a "J" hook comprising at least a third hook end, the "T" hook being alternately insertable between the first and second hook plates for engagement of the at least third hook end with an aperture among the first and second pluralities of hook apertures.

7. The load tying assembly of claim 6 wherein the "J" hook comprises a fourth hook end.

8. The load tying assembly of claim 7 wherein the first and second hook ends are spaced apart a first distance, wherein the third and fourth hook ends are spaced apart a second distance, and wherein the first and second distances are substantially equal.

9. The load tying assembly of claim 8 wherein the first and second pluralities of hook apertures form a square matrix pattern, the hook apertures within said pattern being spaced apart distances equal to the space between the first and second hook ends, and equal to the space between the third and fourth hook ends.

10. The load tying assembly of claim 9 wherein at least one of the hook ends has a pin receiving aperture therethrough, and further comprising at least a first lock pin, the at least first lock pin securing the at least one hook end within one of the hook apertures among the first and second pluralities of hook apertures.

11. The load tying assembly of claim 10 wherein the at least first "T" hook comprises plate steel.

12. The load tying assembly of claim 11 further comprising a tie fixedly attached to the eye.

\* \* \* \* \*